(12) United States Patent
Umesh et al.

(10) Patent No.: US 8,565,809 B2
(45) Date of Patent: *Oct. 22, 2013

(54) UPLINK RADIO RESOURCE ALLOCATION METHOD, RADIO BASE STATION, AND RADIO NETWORK CONTROLLER

(75) Inventors: Anil Umesh, Yokohama (JP); Masafumi Usuda, Yokosuka (JP); Takehiro Nakamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/491,687

(22) Filed: Jun. 8, 2012

(65) Prior Publication Data

US 2012/0244870 A1    Sep. 27, 2012

Related U.S. Application Data

(60) Continuation of application No. 12/345,855, filed on Dec. 30, 2008, now Pat. No. 8,290,529, and a division of application No. 11/349,951, filed on Feb. 9, 2006, now Pat. No. 7,542,776.

(30) Foreign Application Priority Data

Feb. 9, 2005  (JP) ................................ 2005-033716
Feb. 9, 2006  (JP) ................................ 2006-032654

(51) Int. Cl.
*H04B 7/00*        (2006.01)

(52) U.S. Cl.
USPC ...... 455/522; 455/450; 455/452.1; 455/452.2; 455/453; 370/329; 370/341; 370/431

(58) Field of Classification Search
USPC ........... 455/436–444, 450, 452.1–452.2, 453, 455/522; 370/329, 341, 395.4, 395.42, 468, 370/431, 252
See application file for complete search history.

(56) References Cited

U.S. PATENT DOCUMENTS

2004/0203991 A1\* 10/2004 Chen et al. .................... 455/522
2005/0207359 A1\* 9/2005 Hwang et al. ................. 370/278
2005/0276256 A1\* 12/2005 Raitola et al. ................. 370/349

\* cited by examiner

*Primary Examiner* — Wayne Cai
(74) *Attorney, Agent, or Firm* — Marvin A. Motsenbocker; MOTS Law, PLLC (57) ABSTRACT

An uplink radio resource allocation method allocates, at a radio base station, an uplink radio resource used for uplink user data transmission to a mobile station. The method includes: allocating, at the radio base station, the uplink radio resource, so that total received power in an particular cell of the radio base station is equal to a first target value assigned by a radio network controller; and allocating, at the radio station, the uplink radio resource, so that a ratio of first received power from a serving mobile station to second received power from a non-serving mobile station is equal to a second target value assigned by the radio network controller, a serving cell of the serving mobile station being the particular cell, a non-serving cell of the non-serving mobile station being the particular cell.

1 Claim, 10 Drawing Sheets

UPLINK RADIO RESOURCE ALLOCATION METHOD, RADIO BASE STATION, AND RADIO NETWORK CONTROLLER

CROSS REFERENCE TO RELATED APPLICATION

This application is a continuation of application Ser. No. 12/345,855 filed on Dec. 30, 2008, which is a division of application Ser. No. 11/349,951 filed on Feb. 9, 2006, now U.S. Pat. No. 7,542,776 which is based upon and claims the benefit of priority under 35 USC 119 from prior Japanese Patent Application Nos. 2005-033716 and 2006-032654, filed on Feb. 9, 2005 and Feb. 9, 2006; the entire contents of which are incorporated herein by reference.

BACKGROUND OF THE INVENTION

1. Field of the Invention

The present invention relates to an uplink radio resource allocation method for allocating, at a radio base station, an uplink radio resource used for uplink user data transmission to a mobile station, a radio base station and a radio network controller.

2. Description of the Related Art

Figure 1A:
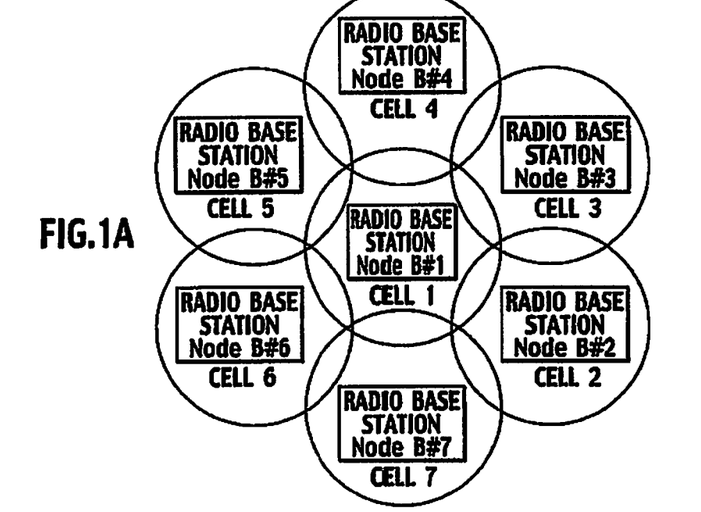
FIGS. 1A to 1D are diagrams for explaining a conventional mobile communication system.

In a general mobile communication system, between one of radio base stations Node B (refer to FIG. 1A) arranged in a cellular pattern and a mobile station UE, user data is transmitted through a radio communication link.

Figure 1B:
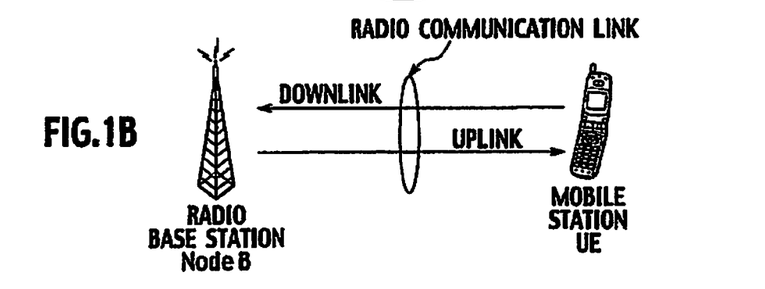

Here, as shown in FIG. 1B, a radio communication link used for transmitting user data from the radio base station Node B to the mobile station UE is referred to as "a downlink" and a radio communication link used for transmitting user data from the mobile station UE to the radio base station Node B is referred to as "an uplink."

The radio base station Node B can simultaneously perform communications with a plurality of mobile stations UE visiting one cell.

Figure 1C:
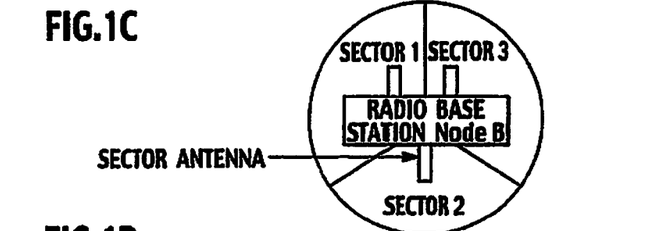

Note that, as shown in FIG. 1C, for the purpose of increasing a radio capacity, a cell controlled by the radio base station Node B is divided into a plurality of sectors by using a plurality of directional antennas (sector antennas).

Figure 1D:
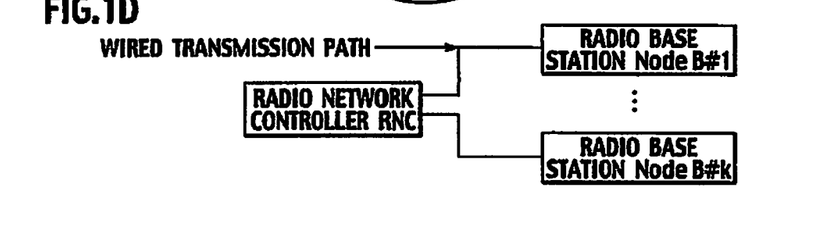

Additionally, as shown in FIG. 1D, a radio resource used between the mobile station UE and the radio base station Node B is managed by a radio network controller RNC connected to the radio base station Node B through a wired transmission channel.

Note that the radio network controller RNC is normally configured to centrally control a plurality of radio base stations Node B.

Figure 2:
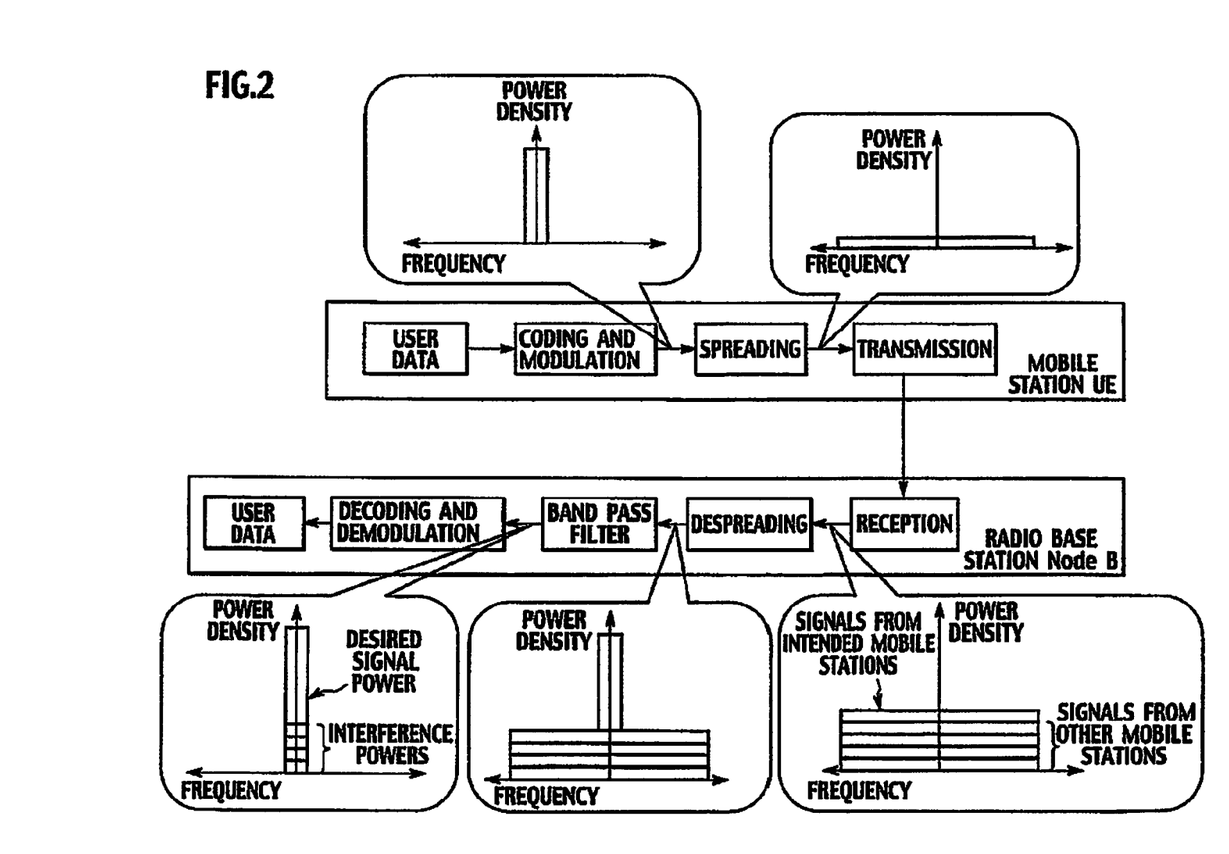
FIG. 2 is a diagram for explaining the conventional mobile communication system.

By using FIG. 2, a description will be given of an uplink radio resource in a mobile communication system where CDMA (Code Division Multiple Access) is used for a radio access method.

In uplinks in the above communication system, each of a plurality of mobile stations UE, after applying encoding and modulation processes to uplink user data, transmits the user data by spreading the data into the same wide frequency range by using a spread code specific to each of the mobile stations UE.

On the other hand, after performing despreading on the uplink user data by using a spread code specific to each of the mobile stations UE upon receipt of radio signals relating to the data, the radio base station Node B decodes the data from the respective mobile stations UE by applying filtering, demodulation and decoding processes to the data.

In this case, with a signal from an intended mobile station, signals from the other mobile stations transmitting uplink user data become interference signals.

Therefore, if there are too many of other mobile stations transmitting the uplink data, or if an uplink transmission rate of the other mobile stations is too high (that is, uplink transmission power thereof is too high), the radio base station Node B is disabled to correctly decode the uplink user data of the intended mobile station.

Therefore, in the uplinks in the above mobile communication system, total received power (total interference power) in the radio base station Node B becomes "an uplink radio resource" shared by the plurality of mobile stations UE.

Here, in the case where the cell controlled by the radio base station Node B is divided into the plurality of sectors, since directivity is provided to each of the sectors, uplink radio resources (uplink interference power) shared by mobile stations UE are independent from one another between the respective sectors.

Therefore, the amount of the uplink radio resources (the uplink interference power) in the cell controlled by the radio base station Node B increases with increasing the number of the sectors (in other words, a radio capacity increases with increasing the number of the sectors).

By using FIGS. 3A to 3E, a description will be given of transmission power control and "other-cell (other-sector) interference" in the mobile communication system to which CDMA (Code Division Multiple Access) is applied.

As described above, in the above mobile communication system, total interference power in the radio base station Node B becomes a radio resource shared by a plurality of the mobile stations UE.

Therefore, the radio base station Node B controls the transmission power of the respective mobile stations UE, so that the received power is equal to minimum received power required to satisfy uplink communication quality between the radio base station Node B and each of the mobile stations UE.

In this case, the minimum received power required to satisfy uplink communication quality (hereinafter, referred to as required received power of radio base station) mainly depends on an uplink transmission rate of the mobile stations UE (i.e., a transmission rate of uplink user data) although it also changes depending on transmission environment and on moving speed of the mobile stations UE.

Figure 3A:
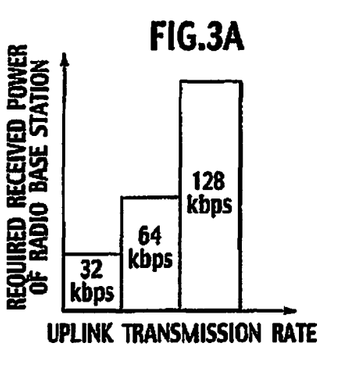
FIGS. 3A to 3E are diagrams for explaining the conventional mobile communication system.

Here, the required received power of radio base station changes in proportion to the uplink transmission rate of the mobile station UE, and as shown in FIG. 3A, twice as much as the required received power of radio base station is needed if the uplink transmission rate becomes double.

To the contrary, if the uplink transmission rate is unchanged, the required received power of radio base station is unchanged regardless of a location of the mobile station UE visiting a particular cell (sector).

Figure 3B:
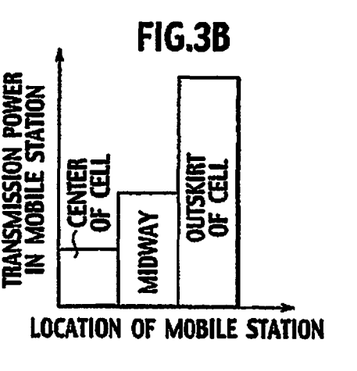
Figure 3C:
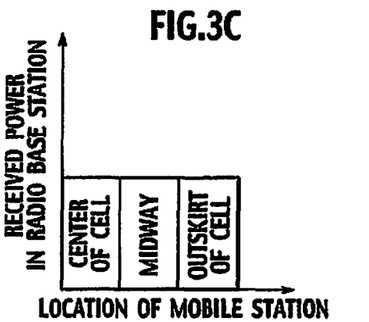

On the other hand, power of a radio signal attenuates with increasing distance through which data is transmitted. Therefore, as shown in FIGS. 3B and 3C, the radio base station Node B is configured to control, even when an uplink transmission rate of the mobile station UE is constant, transmission power of each of the mobile stations UE in the following manner.

The radio base station Node B reduces the "transmission power in mobile station" if the mobile station UE is near the base station Node B, and rises the "transmission power in mobile station" if the mobile station UE is far from the base station Node B.

However, since a transmission antenna of the mobile station UE does not have directivity, uplink transmission from the mobile station UE reaches not only a sector of the radio base station Node B to which the mobile station UE is connected through an uplink, but also another sector of the same radio base station Node B or a cell of a neighboring radio base station Node B, becomes interference in those cells (sectors).

Figure 3D:
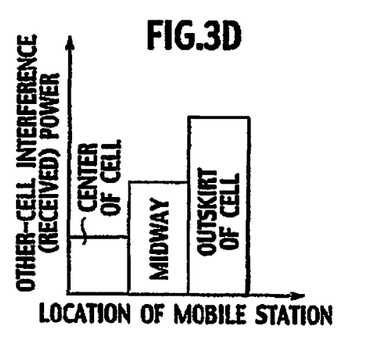
Figure 3E:
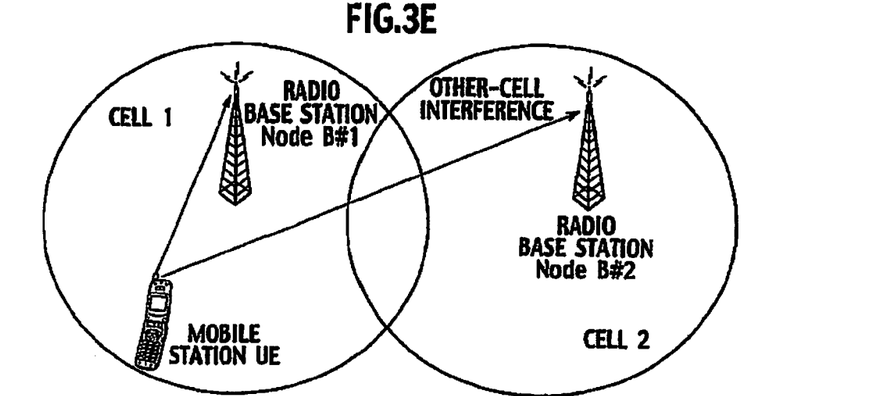

The thus described interference caused in a neighboring cell (sector) by the transmission power from the mobile station UE will be referred to as "other-cell (other-sector) interference" (refer to FIGS. 3D and 3E).

Figure 4:
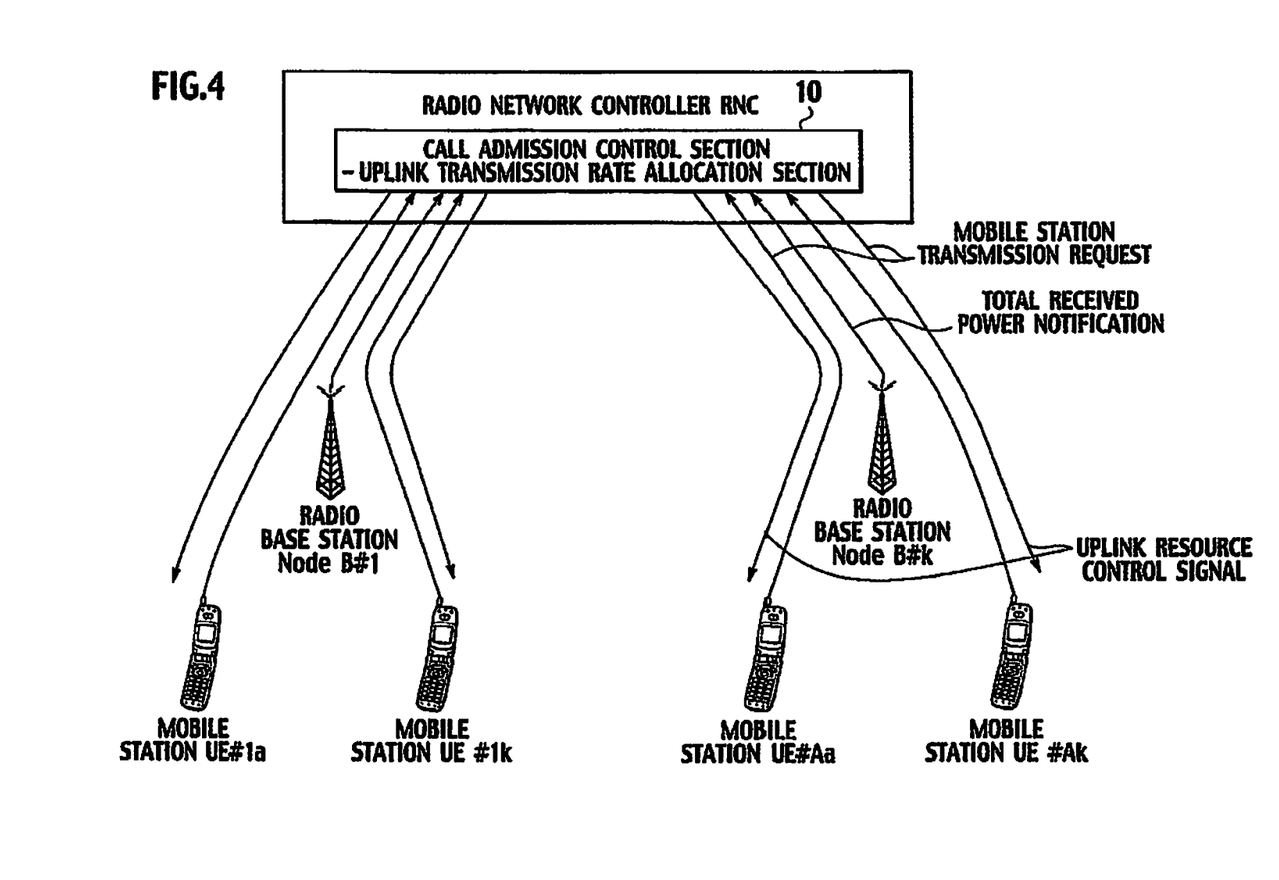
FIG. 4 is a diagram for explaining the conventional mobile communication system.

By using FIG. 4, a description will be given of a conventional uplink radio resource control method in the mobile radio communication system to which CDMA (Code Division Multiple Access) is applied.

Conventionally, a radio network controller RNC has been performing a call admission control process and an uplink transmission rate allocation process with respect to each mobile station UE.

By referring to both transmission power, transmitter performance, a transmission rate required by an application thereof and the like of a mobile station UE requesting a connection via a dedicated channel (DCH), the radio network controller RNC accepts a connection request from the mobile station UE and determines an uplink transmission rate allocated to the mobile station UE in a range such that total interference power in a cell (sector) to which an uplink is intended to be set up and in neighboring cells (sectors) thereof respectively does not exceed maximum allowable interference power.

Subsequently, through a layer-3 (RRC: Radio Resource Control) message, the radio network controller RNC notifies the radio base station Node B and the mobile station UE of acceptance of the connection request from the mobile station UE, and of the uplink transmission rate.

Specifically, the radio network controller RNC allocates an uplink transmission rate to a mobile station UE requesting a connection via a DCH in the following manners.

(1) If the radio network controller RNC judges that total interference power in a cell (sector) to which an uplink is intended to be set up and in neighboring cells (sectors) thereof does not exceed the maximum allowable interference power respectively, it accepts a connection request from the mobile station UE, and allocates an intended uplink transmission rate.

(2) If the radio network controller RNC judges that total interference power in at least any one of a cell (sector) to which an uplink is intended to be set up and in neighboring cells (sectors) thereof exceeds the maximum allowable interference power respectively, it accepts a connection request from the mobile station UE. However, it allocates an uplink transmission rate which is lower than an intended uplink transmission rate and which is in a range such that total interference power in the cell (sector) to which the uplink is intended to be set up and in the neighboring cells (sectors) thereof do not exceed the maximum allowable interference power respectively.

(3) If the radio network controller RNC judges that total interference power in at least any one of a cell (sector) to which an uplink is intended to be set up and in neighboring cells (sectors) exceeds the maximum allowable interference power, it accepts a connection request from the mobile station UE. However, by lowering an uplink transmission rate allocated to another mobile station in the cell (sector) to which the uplink is intended to be set up or in neighboring cells (sectors) thereof, it allocates an uplink transmission rate in a range such that total interference power in the cell (sector) to which an uplink is intended to be set up and in the neighboring cells (sectors) thereof does not exceed the maximum allowable interference power respectively.

(4) If the radio network controller RNC judges that total interference power in at least any one of a cell (sector) to which an uplink is intended to be set up and neighboring cells (sectors) thereof exceeds the maximum allowable interference power respectively, it performs both controls of (2) and (3).

(5) If the radio network controller RNC judges that total interference power in at least any one of a cell (sector) to which an uplink is intended to be set up and in neighboring cells (sectors) thereof exceeds the maximum allowable interference power respectively, it does not accept a connection request from the mobile station UE.

Thus, since the radio network controller RNC normally centrally controls a large number of radio base stations Node B, it can efficiently allocate, by referring to uplink transmission states of mobile stations UE communicating with the respective radio base stations Node B, and also by referring to other-cell (other-sector) interference in the respective radio base stations Node B, uplink radio resources among mobile stations UE requesting connections to the radio base stations Node B.

By using FIGS. 5A to 5C, a description will be given of problems in the case where the radio network controller RNC performs radio resource control on an uplink in a conventional mobile radio communication system to which CDMA (Code Division Multiple Access) is applied.

Generally, in data communications, traffic often arises in a bursting manner as compared with voice communications and TV communications. Therefore, naturally, it is desired that a channel transmission rate used for data communications be changed to a high speed.

Figure 5A:
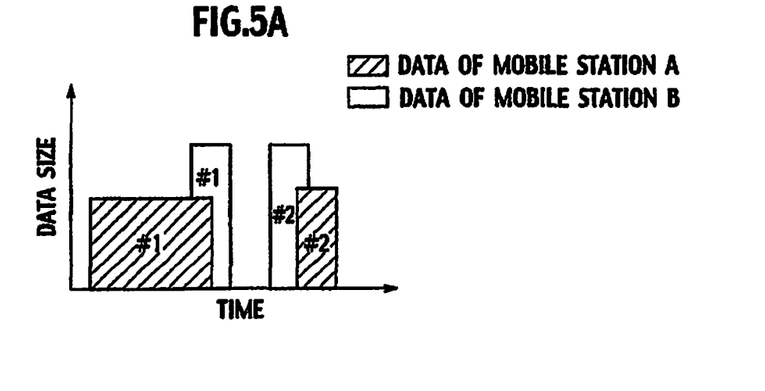
FIGS. 5A to 5C are diagrams for explaining the conventional mobile communication system.
Figure 5B:
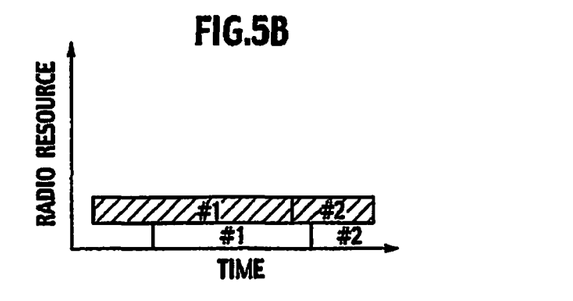
Figure 5C:
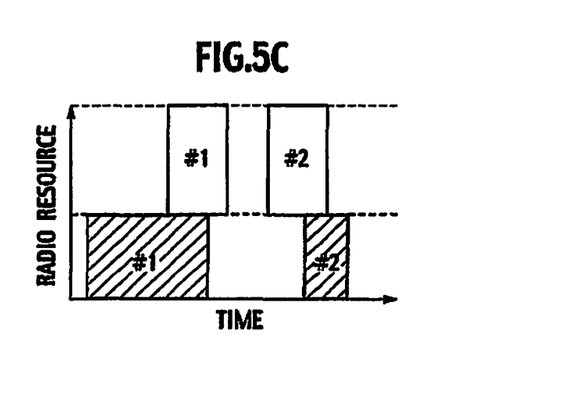

However, as shown in FIGS. 5A to 5C, the radio network controller RNC normally centrally controls a large number of radio base stations Node B, and therefore, in the conventional communication system, for reasons such as processing loads and processing delays, there has been a problem that it is difficult for the radio network controller RNC to perform alteration control on a transmission rate of a high-speed channel (in a range approximately of 1 to 100 ms).

Additionally, in the conventional communication system, even if the radio network controller RNC can perform the alteration control on the transmission rate of a high-speed channel (in a range approximately of 1 to 100 ms), there has been a problem that an equipment installation cost and a network operating cost become considerably high.

Therefore, in the conventional communication system, it is a common practice that the radio network controller RNC performs alteration control of a transmission rate of the channel in the order of several hundred milliseconds to several seconds.

Accordingly, in the conventional communication system, in a case where data transmission in a bursting manner is performed as shown in FIG. 5A, the data transmission is performed by any one of ways respectively shown in FIGS. 5B and 5C.

In FIG. 5B, the data transmission is performed by allowing a low speed, a high delay and a low transmission efficiency, and in FIG. 5C, the data transmission is performed by securing a radio resource for a high-speed communication and thus by allowing a radio bandwidth resource in a vacant time and a hardware resource in a radio base station Node B to be wasted.

Consequently, in "3GPP" and "3GPP2" which are international standardization organizations for a 3rd Generation Mobile Communication System, high-speed radio resource control methods in a layer-1 between a radio base station Node B and a mobile station UE, and in a MAC sub-layer (a layer-2) have been studied for the purpose of making efficient use of a radio resource.

Hereinafter, the study itself and functions studied therein are collectively referred to as "enhanced uplink (EUL)".

By using FIGS. 6A to 6B, a description will be given of a difference between "a radio resource control process according to a conventional method" and "a radio resource control process according to an EUL method" in an uplink in a mobile radio communication system to which CDMA (Code Division Multiple Access) is applied.

In the EUL method, in contrast to the conventional method where the radio resource control process is performed by a radio network controller RNC, the radio resource control process is configured to be performed directly by radio base stations Node B.

In the EUL method, the maximum allowable interference power in cells (sectors) are notified to the respective radio base stations Node B by the radio network controller RNC.

Then, the radio base station Node B instantly determines uplink transmission rates of respective mobile stations UE in a range such that total interference power in the cell does not exceed the maximum allowable reference power notified by the radio network controller RNC, by referring to transmission power, transmitter performance of the mobile stations UE, transmission rates needed by applications thereof and the like of the mobile stations UE connected to its own cell (sectors) through E-DCH.

Subsequently, the radio base station Node B notifies the determined uplink transmission rates to each of the mobile stations UE as a layer-1 or MAC sub-layer massage.

Figure 6A:
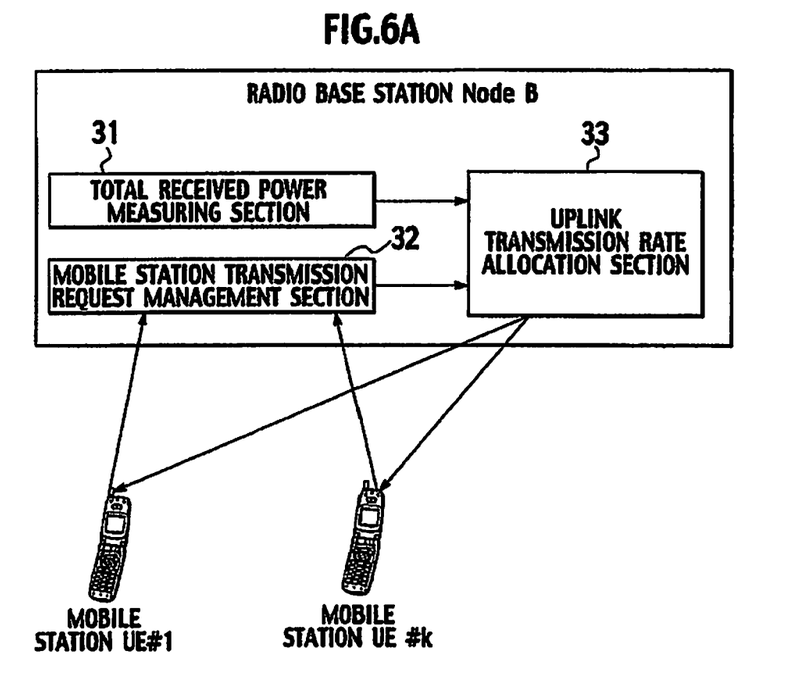
FIGS. 6A and 6B are diagrams for explaining the conventional mobile communication system.
Figure 6B:
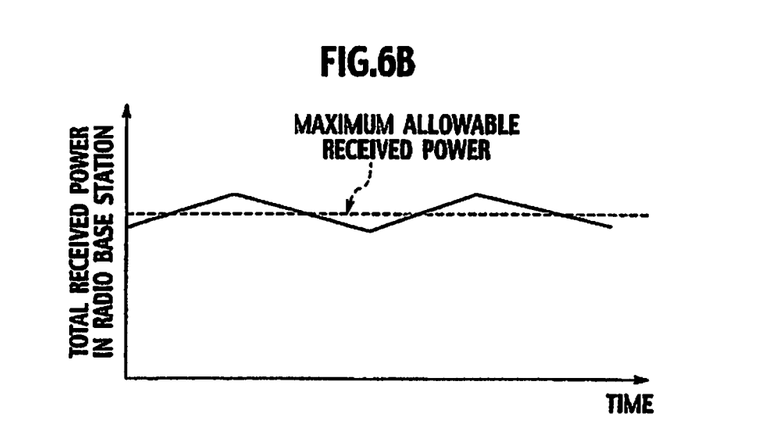

In the above manner, the radio base station Node B accepts connection requests of the mobile stations UE, and determines the uplink transmission rates allocated to the mobile stations UE (refer to FIGS. 6A and 6B).

Consequently, the uplink transmission rates of the mobile stations UE can be dynamically controlled into high speeds (in a range of 2 to 10 ms, for example), whereby it becomes possible to make efficient use of the uplink radio resource.

Figure 7:
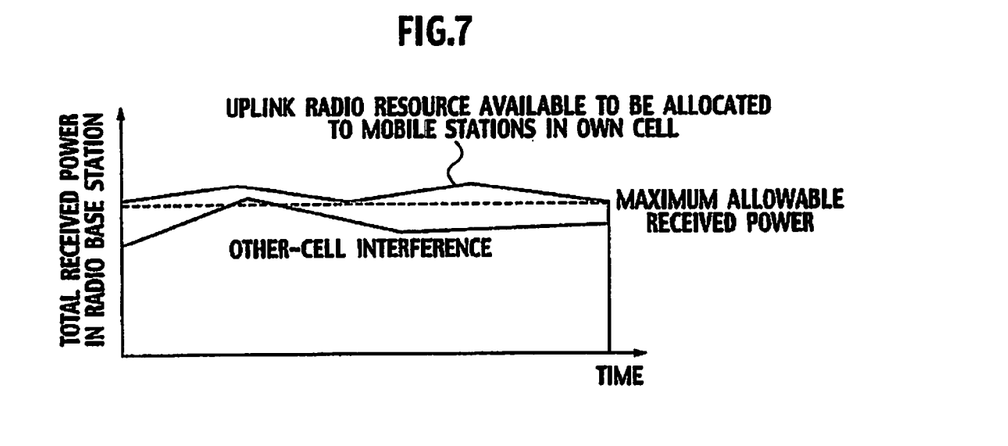
FIG. 7 is a diagram for explaining the conventional mobile communication system.

By using FIG. 7, a description will be given of problems in the EUL method where radio resource control is performed directly by a radio base station Node B.

In the EUL method, because the radio resource control is performed directly by the radio base station Node B, there arises a problem that an uplink radio resource cannot be allocated by, as is performed in the conventional method, referring to uplink transmission states and other-cell (other-sector) interference of mobile stations UE communicating with neighboring radio base stations Node B.

Consequently, if the radio base station Node B is aware only of constantly making efficient use of a radio resource in its own cell (sectors) and of satisfying desired transmission rates of mobile stations UE connected through E-DCH to its own cell (sectors), it results in causing a great deal of other-cell (other-sector) interference in the neighboring radio base stations Node B.

In this case, a transmission rate of each of the mobile stations UE connected to one of the neighboring radio base stations Node B is restricted, and hence, required communication quality therebetween cannot be satisfied. It is considered that, at worst, a call from the mobile station UE is disconnected.

As described above, in the EUL method, an uplink transmission rate of a mobile station UE can be dynamically controlled into a high speed (in a range of 2 to 10 ms, for example) by having uplink radio resource control performed directly by the radio base station Node B.

However, by having the uplink radio resource control performed directly by the radio base station Node B, there arises a problem that an uplink radio resource cannot be allocated by, as is performed in the conventional method, referring to both uplink transmission states and other-cell (other-sector) interference of mobile stations UE communicating with the neighboring radio base stations Node B.

BRIEF SUMMARY OF THE INVENTION

Accordingly, the present invention has been made in consideration of the above points, and objects of the present invention are to provide an uplink radio resource allocation method, a radio base station, and a radio network controller which, even in a mobile communication system where radio resource control on uplinks is performed directly by the radio base station Node B, allow uplink radio resources shared among radio base stations Node B (among cells) to be efficiently allocated and thus allow both communication quality degradation and call disconnections in an uplink of each mobile station UE to be prevented.

A first aspect of the present invention is summarized as an uplink radio resource allocation method for allocating, at a radio base station, an uplink radio resource used for uplink user data transmission to a mobile station, including: allocating, at the radio base station, the uplink radio resource, so that total received power in an particular cell of the radio base station is equal to a first target value assigned by a radio network controller; and allocating, at the radio station, the uplink radio resource, so that a ratio of first received power from a serving mobile station to second received power from a non-serving mobile station is equal to a second target value assigned by the radio network controller, a serving cell of the serving mobile station being the particular cell, a non-serving cell of the non-serving mobile station being the particular cell.

A second aspect of the present invention is summarized as a radio base station which allocates an uplink radio resource used for uplink user data transmission to a mobile station, including: a first radio resource allocation section configured to allocate the uplink radio resource, so that total received power in a particular cell of the radio base station is equal to a first target value assigned by a radio network controller; and a second radio resource allocation section configured to allocates the uplink radio resource, so that a ratio of first received power from a serving mobile station to second received power from a non-serving mobile station is equal to a second target value assigned by the radio network controller, a serving cell of the serving mobile station being the particular cell, a non-serving cell of the non-serving mobile station being the particular cell.

A third aspect of the present invention is summarized as a radio network controller used in an uplink radio resource allocation method for allocating, at a radio base station, an uplink radio resource used for uplink user data transmission to a mobile station, including: a first target value assignation section configured to assign a first target value as a target value for total received power in a particular cell of the radio base station, the first target value used when the radio base station allocates the uplink radio resource; and a second target value assignation section configured to assign a second target value as a target value for a ratio of first received power from a serving mobile station to second received power from a non-serving mobile station, the second target value used when the radio base station allocates the uplink radio resource, a serving cell of the serving mobile station being the particular cell, a non-serving cell of the non-serving mobile station being the particular cell.

A fourth aspect of the present invention is summarized as an uplink radio resource allocation method for allocating, at a radio base station, an uplink radio resource used for uplink user data transmission to a mobile station, including: comparing, at the radio base station, total received power in an particular cell of the radio base station with a first target value assigned by a radio network controller; comparing, at the radio base station, a ratio of first received power from a serving mobile station to second received power from a non-serving mobile station with a second target value assigned by the radio network controller, when the total received power is not larger than the first target value, a serving cell of the serving mobile station being the particular cell, a non-serving cell of the non-serving mobile station being the particular cell; and maintaining, at the radio base station, the uplink radio resource allocated to the non-serving mobile station unchanged, when the ratio is not smaller than the second target value.

In the fourth aspect, the step of comparing the total received power with the first target value can include a step of checking whether or not the total received power is larger than the first target value.

In the fourth aspect, the step of comparing the total received power with the first target value can further include a step of checking whether or not the total received power is equal to the first target value.

In the fourth aspect, the step of comparing the ratio with the second target value can be executed, when the total received power is equal to the first target value.

A fifth aspect of the present invention is summarized as a radio base station which allocates an uplink radio resource used for uplink user data transmission to a mobile station, including: a first comparison section configured to compare total received power in an particular cell of the radio base station with a first target value assigned by a radio network controller; a second comparison section configured to compare a ratio of first received power from a serving mobile station to second received power from a non-serving mobile station with a second target value assigned by the radio network controller, when the total received power is not larger than the first target value, a serving cell of the serving mobile station being the particular cell, a non-serving cell of the non-serving mobile station being the particular cell; and a resource allocation section configured to maintain the uplink radio resource allocated to the non-serving mobile station unchanged, when the ratio is not smaller than the second target value.

In the fifth aspect, the first comparison section can be configured to check whether or not the total received power is larger than the first target value.

In the fifth aspect, the first comparison section can be configured to check whether or not the total received power is equal to the first target value.

DETAILED DESCRIPTION OF THE INVENTION (A Configuration of a Mobile Communication System According to a First Embodiment of the Present Invention)

Figure 8:
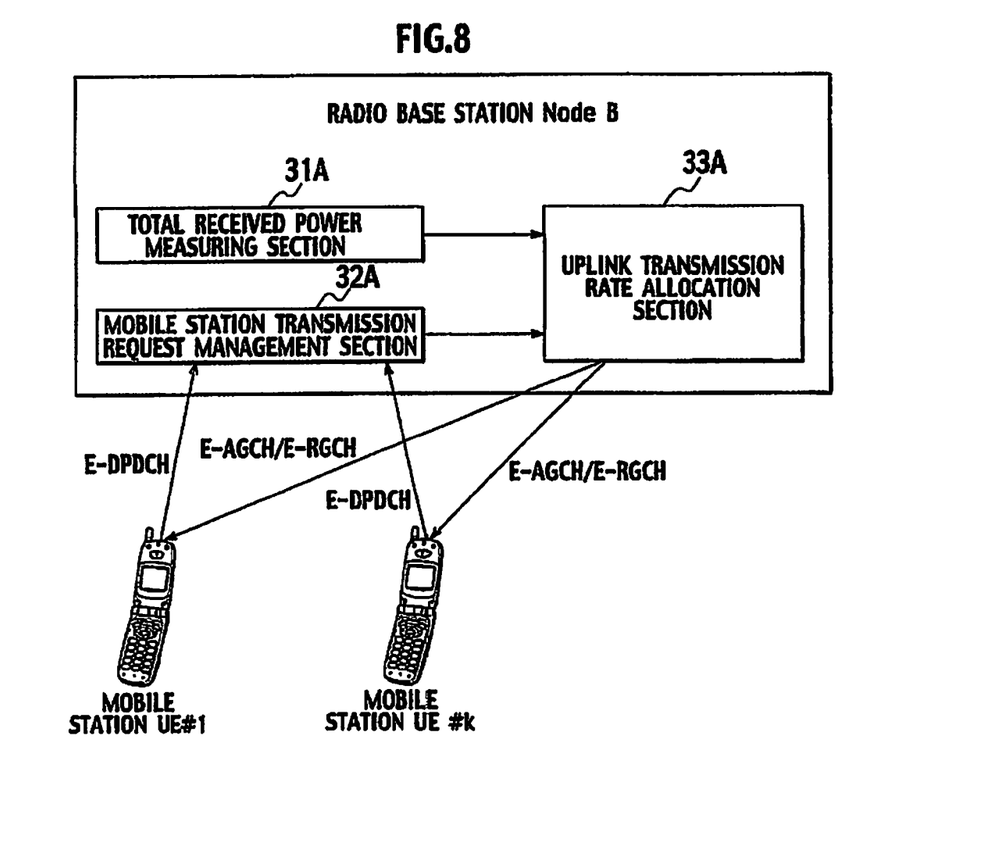
FIG. 8 is an entire configuration diagram of a mobile communication system according to one embodiment of the present invention.
Figure 9:
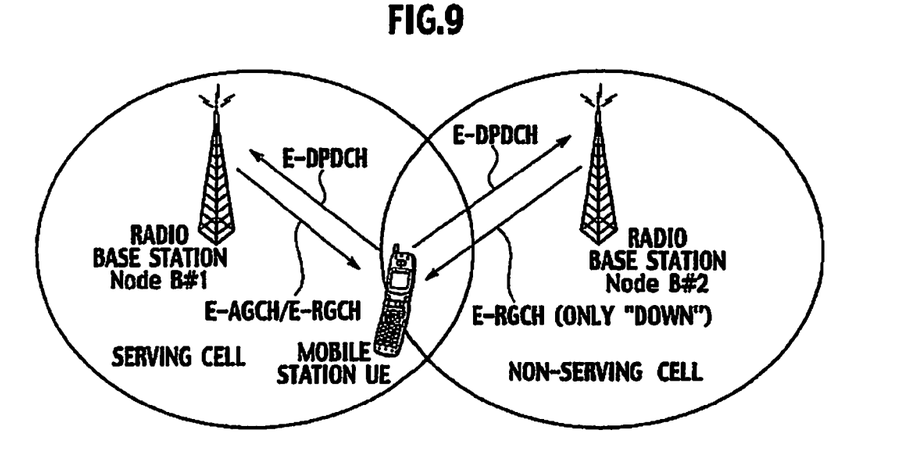
FIG. 9 is a channel configuration diagram of the mobile communication system according to the embodiment of the present invention.
Figure 10:
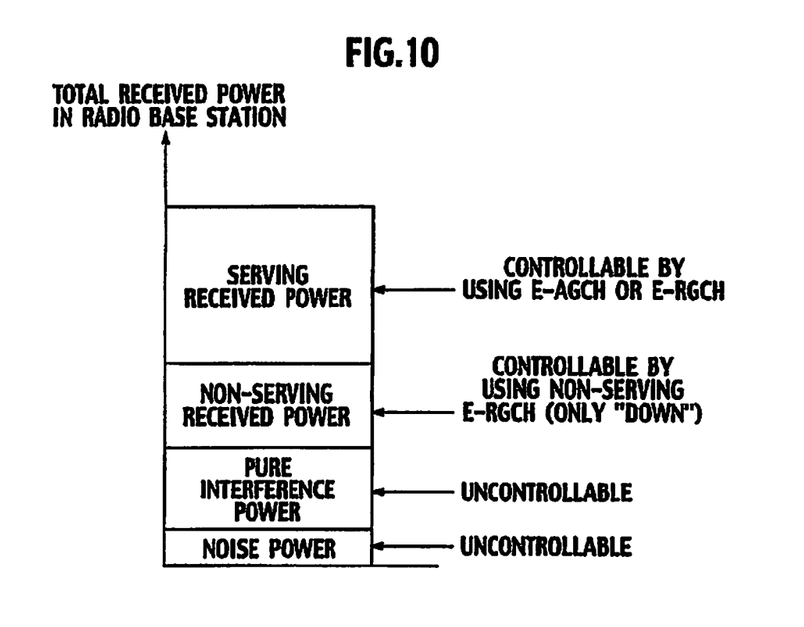
FIG. 10 is a diagram showing a breakdown of total received power in a radio base station in the mobile communication system according to the embodiment of the present invention.

With reference to FIGS. 8 to 10, a description will be given of a configuration of a mobile communication system according to a first embodiment of the present invention In the mobile communication system according to this embodiment, transmission of user data is performed through a radio communication link between each of radio base stations Node B arranged in a cellular pattern and a mobile station UE.

Here, a cell controlled by each of the radio base stations Node B may be divided into a plurality of sectors. Additionally, a plurality of base stations Node B are centrally controlled by a radio network controller RNC.

Note that, in the present detailed description, unless particularly stated, a notion of a cell includes a notion of a sector.

In the mobile communication system according to this embodiment, the EUL method is applied to transmission of uplink user data, and the radio base stations Node B are configured to control transmission rates of mobile stations UE.

Here, with reference to FIG. 8, a description will be given of main physical channels set up between each of the mobile stations UE #1 and UE #2 and the radio base stations Node B.

In an uplink, an E-DPDCH (E-DCH Dedicated Physical Data Channel) is set up, whereby the mobile station UE transmits uplink user data to the radio base station Node B by using the E-DPDCH.

In a downlink, an E-AGCH (E-DCH Absolute Grant Channel) and an E-RGCH (E-DCH Relative Grant Channel) are set up, whereby the radio base station Node B transmits, to the mobile stations UE #1 and UE #2, information on an uplink radio resource (a transmission rate or transmission power) allocated to the mobile stations UE #1 and UE #2 by using the E-AGCH and E-RGCH.

Specifically, to the mobile station UE, the radio base station Node B notifies an absolute value of the uplink radio resource allocated to the mobile station UE by using the E-AGCH, and notifies a relative value (up/down) of the uplink radio resource allocated to the mobile station UE by using the E-RGCH.

Furthermore, soft handover is applied to the mobile communication system according to this embodiment.

Here, a description will be given of the soft handover in uplink user data transmission to which the EUL method is applied.

Normally, a mobile station UE is connected to a radio base station Node B (cell) which is the best in radio communication link quality, and such a radio base station Node B as above is referred to as "a serving cell" of the mobile station UE.

Additionally, if there is a different cell which is not very poor in radio communication link quality as compared to the serving cell, the mobile station UE is connected also to the different cell, which is referred to as "a non-serving cell" of the mobile station UE.

This state is referred to as "soft handover".

Here, normally, a mobile station UE located in the center of a cell is configured to connect to only one cell, and a mobile station UE located in an outskirt of a cell is configured to perform the soft handover.

In the soft handover state, all of cells to which the mobile station UE is connected attempt demodulation of uplink user data which the mobile station UE transmits by using the E-DPDCH.

However, it is only the serving cell that can leadingly allocate an uplink radio resource to the mobile station UE by using the E-AGCH and E-RGCH.

The non-serving cell can only restrict, by using the E-RGCH without "up" (that is, only with "down", which will be hereinafter referred to as a non-serving E-RGCH), the uplink radio resource used by the mobile station UE.

With reference to FIGS. 9 and 10, a description will be given of radio resource control in the EUL method applied to the mobile communication system according to the present invention.

As shown in FIG. 10, total received power (total interference power) in a radio base station Node B consists of received power (hereinafter, referred to as serving received power) from mobile stations for which its own cell is working as a serving cell (hereinafter, referred to as serving mobile stations), and received power from mobile stations for which other cells are working as serving cells.

Furthermore, the received power from mobile stations for which other cells work as serving cells is broken down into: received power (hereinafter, referred to as non-serving received power) from mobile stations for which its own cell is working as a non-serving cell (hereinafter, referred to as non-serving mobile stations), and received power (hereinafter, referred to as pure interference power) from mobile stations for which its own cell is not working as a non-serving cell (hereinafter, referred to as interference mobile stations).

Here, although the radio base station Node B can control the serving received power at its own judgment by using the E-AGCH and E-RGCH, and can restrict the non-serving received power by using the non-serving E-RGCH, it cannot control at all the pure interference power (and noise power).

(Operations of the Mobile Communication System According to the First Embodiment of the Present Invention)

Figure 11:
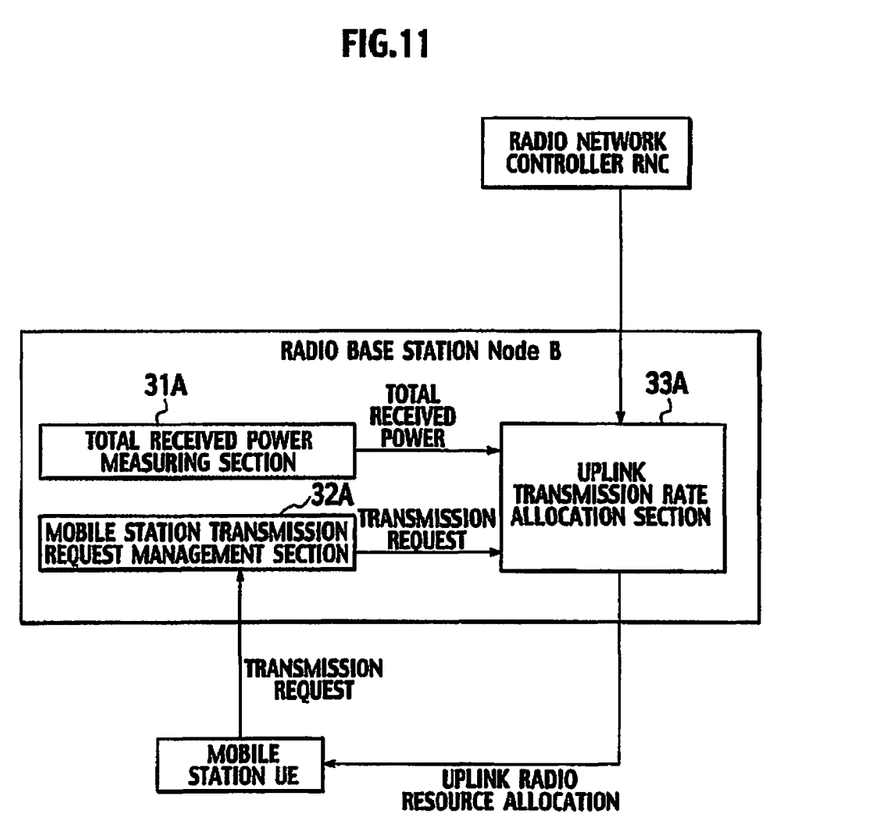
FIG. 11 is a diagram for explaining operations of the mobile communication system according to the embodiment of the present invention.
Figure 12:
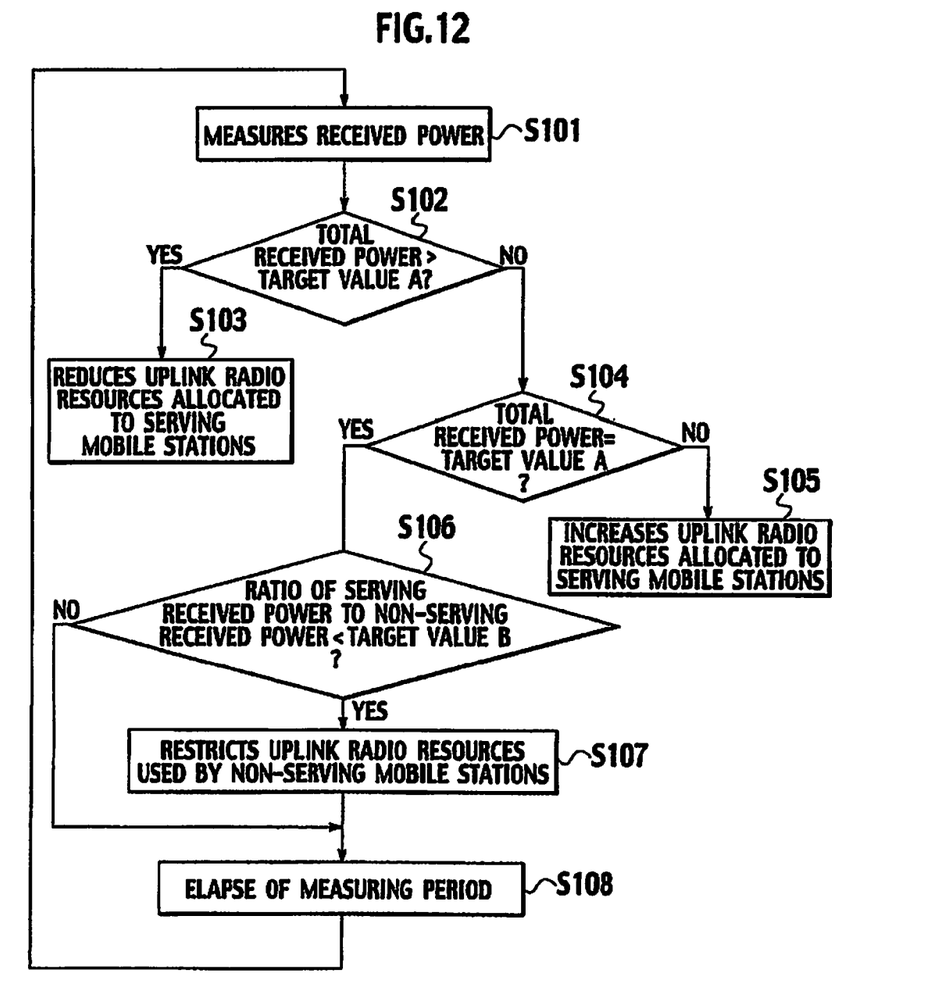
FIG. 12 is a flowchart showing the operations of the mobile communication system according to the embodiment of the present invention.

With reference to FIGS. 11 to 12, a description will be given of operations of the mobile communication system according to the first embodiment of the present invention.

As shown in FIG. 11, for each of the radio base stations Node B, a target value A (first target value) for the maximum total received power in each of the cells, and a target value B (second target value) for a ratio of serving received power (first received power) to non-serving received power (second received power) are assigned in advance by the radio network controller RNC.

The ratio of the serving received power to the non-serving received power is a value calculated by dividing the serving received power by the non-serving received power.

As shown in FIG. 12, in Step S101, each of the radio base stations Node B measures total received power in each of the cells on a periodic basis, that is, every 2 to 10 ms for example.

In Step S102, the radio base station Node B compares the measured total received power with the target value A (first target value) for the maximum total received power assigned by the radio network controller RNC.

If the measured total received power is higher than the target value A, the radio base station Node B, by using the E-AGCH or the E-RGCH, reduces uplink radio resources allocated to serving mobile stations thereof in Step S103.

On the other hand, if the measured total received power is lower than the target value A, the radio base station Node B, by using the E-AGCH or E-RGCH, increases uplink radio resources allocated to the serving mobile stations in order to bring the total received power closer to the target value A in Step S105.

Additionally, in parallel with the above steps, each of the radio base stations Node B calculates a ratio of the serving received power to the non-serving received power on a periodic basis, that is, every 2 to 10 ms for example.

In Step S106, the radio base station Node B compares the calculated ratio of the serving received power to the non-serving received power with the target value B of the ratio of the serving received power to the non-serving received power assigned by the radio network controller RNC.

If the calculated ratio of the serving received power to the non-serving received power is lower than the target value B, the radio base station Node B, by using the non-serving E-RGCH, restricts uplink radio resources used by the non-serving mobile stations in order to bring the ratio closer to the target value B in Step S107.

However, if the calculated ratio of the serving received power to the non-serving received power is higher than the target value B, the radio base station Node B does not restrict uplink radio resources used by the serving mobile stations.

(Effects and Advantages of the Mobile Communication System According to the First Embodiment of the Present Invention)

In the mobile communication system according to the first embodiment of the present invention, even if the mobile communication system wherein radio resource control on uplinks is performed directly by a radio base station Node B, uplink radio resources shared among radio base stations Node B can be efficiently allocated, and thus, both degradation of communication quality and call disconnections in uplinks of the mobile stations UE can be prevented According to the present invention, it is possible to provide an uplink radio resource allocation method, a radio base station, and a radio network controller which, even in a mobile communication system where radio resource control on uplinks is performed directly by the radio base station Node B, allow uplink radio resources shared among radio base stations Node B (among cells) to be efficiently allocated and thus allow both communication quality degradation and call disconnections in an uplink of each mobile station UE to be prevented.

Additional advantages and modifications will readily occur to those skilled in the art. Therefore, the invention in its broader aspects is not limited to the specific details and the representative embodiments shown and described herein.

Accordingly, various modifications may be made without departing from the scope of the general inventive concept as defined by the appended claims and their equivalents.

What is claimed is:

1. A radio network controller used in an uplink radio resource allocation method for allocating, at a radio base station, an uplink radio resource used for uplink user data transmission to a mobile station, comprising:
a first target value assignment section configured to assign a first target value as a target value for total received power in a particular cell of the radio base station, the first target value used to determine whether or not to restrict transmission of an Enhanced Relative Grant Channel of a non-serving mobile station.

* * * * *